(12) United States Patent
Bromberg et al.

(10) Patent No.: US 10,907,502 B2
(45) Date of Patent: Feb. 2, 2021

(54) SYSTEM AND METHOD OF FABRICATING AND REPAIRING A GAS TURBINE COMPONENT

(71) Applicant: General Electric Company, Schenectady, NY (US)

(72) Inventors: Vadim Bromberg, Niskayuna, NY (US); Jonathan Matthew Lomas, Simpsonville, SC (US); Hongqiang Chen, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/133,622

(22) Filed: Sep. 17, 2018

(65) Prior Publication Data

US 2019/0017413 A1 Jan. 17, 2019

Related U.S. Application Data

(62) Division of application No. 15/052,039, filed on Feb. 24, 2016, now Pat. No. 10,100,668.

(51) Int. Cl.
*F01D 25/12* (2006.01)
*B23P 6/00* (2006.01)
(Continued)

(52) U.S. Cl.
CPC ............. *F01D 25/12* (2013.01); *B23P 6/002* (2013.01); *B25J 9/1664* (2013.01); *C23C 28/04* (2013.01);
(Continued)

(58) Field of Classification Search
CPC ........ G05B 2219/40512; G05B 19/412; F05D 2260/202; F05D 2230/90; F05D 2230/80;
(Continued)

(56) References Cited

U.S. PATENT DOCUMENTS

| 4,743,462 A | 5/1988 | Radzavich et al. |
| 5,216,808 A | 6/1993 | Martus et al. |

(Continued)

FOREIGN PATENT DOCUMENTS

| CN | 1765829 A | 5/2006 |
| CN | 10256217 A | 7/2012 |

(Continued)

OTHER PUBLICATIONS

Yung, Edward K. et al.; "Plating of Copper into Through-Holes and Vias"; Journal of the Electrochemical Society; 1989; vol. 136, Issue: 1; pp. 206-215.

(Continued)

*Primary Examiner* — Jacob J Cigna
(74) *Attorney, Agent, or Firm* — Armstrong Teasdale LLP (57) ABSTRACT

A method of fabricating and repairing a gas turbine component having a plurality of cooling holes defined therein is provided. The method includes determining a parameter of a first cooling hole defined in the gas turbine component, and generating a tool path for forming a protective cap around the first cooling hole. The tool path is based at least partially on the parameter of the first cooling hole. The method also includes directing a robotic device to follow the tool path, and discharging successive layers of ceramic slurry towards the gas turbine component as the tool path is followed such that the protective cap is formed around the first cooling hole.

20 Claims, 5 Drawing Sheets

(51) Int. Cl.
    *C23C 28/04* (2006.01)
    *F01D 5/00* (2006.01)
    *F01D 5/18* (2006.01)
    *B25J 9/16* (2006.01)
    *G05B 19/402* (2006.01)

(52) U.S. Cl.
    CPC ............. *F01D 5/005* (2013.01); *F01D 5/186* (2013.01); *G05B 19/402* (2013.01); *B23P 2700/06* (2013.01); *F05D 2220/32* (2013.01); *F05D 2230/80* (2013.01); *F05D 2230/90* (2013.01); *F05D 2260/202* (2013.01); *G05B 2219/40512* (2013.01); *Y02T 50/60* (2013.01)

(58) Field of Classification Search
    CPC ...... F05D 2220/32; F01D 25/12; F01D 5/186; F01D 5/005; C23C 28/04; B25J 9/1664; B23P 2700/06; B23P 6/007; B23P 6/002
    See application file for complete search history.

(56) References Cited

U.S. PATENT DOCUMENTS

| | | | |
|---|---|---|---|
| 5,902,647 A | 5/1999 | Venkataramani et al. | |
| 6,265,022 B1* | 7/2001 | Fernihough | F01D 5/28 427/142 |
| 6,383,602 B1* | 5/2002 | Fric | F01D 5/186 428/131 |
| 6,602,053 B2 | 8/2003 | Subramanian et al. | |
| 8,661,826 B2 | 3/2014 | Garry et al. | |
| 9,551,058 B2* | 1/2017 | Reid | C23C 4/01 |
| 10,100,668 B2* | 10/2018 | Bromberg | B25J 9/1664 |
| 10,272,461 B2* | 4/2019 | Coskun | B05B 12/26 |
| 2009/0142548 A1* | 6/2009 | Patterson | F23R 3/007 428/137 |
| 2011/0076405 A1* | 3/2011 | Raji | F01D 5/005 427/348 |
| 2012/0164376 A1* | 6/2012 | Bunker | B23K 35/0261 428/131 |
| 2014/0102684 A1* | 4/2014 | Sezer | F01D 5/288 165/168 |
| 2014/0120274 A1* | 5/2014 | Bunker | B05D 3/12 428/34.1 |
| 2014/0166255 A1 | 6/2014 | Bogue et al. | |
| 2014/0234555 A1* | 8/2014 | Saint-Jacques | F01D 5/288 427/569 |
| 2014/0255158 A1* | 9/2014 | Burd | F01D 5/288 415/115 |
| 2014/0338347 A1 | 11/2014 | Gage et al. | |
| 2015/0037498 A1 | 2/2015 | Bruck et al. | |
| 2015/0159254 A1* | 6/2015 | Reid | C23C 14/044 428/137 |
| 2015/0369059 A1* | 12/2015 | Burd | F01D 5/288 427/140 |
| 2016/0083829 A1* | 3/2016 | Reid | C23C 4/02 427/448 |
| 2016/0090843 A1 | 3/2016 | Albert et al. | |
| 2017/0130591 A1 | 5/2017 | Bunker | |
| 2018/0347442 A1* | 12/2018 | Lacy | B33Y 80/00 |

FOREIGN PATENT DOCUMENTS

| | | |
|---|---|---|
| CN | 104700196 A | 6/2015 |
| FR | 2964585 A1 | 3/2012 |

OTHER PUBLICATIONS

Rizvi, Nadeem H.; "Production of Novel 30 Microstructures Using Excimer Laser Mask Projection Techniques"; available at http://www.lasermicromachining.com/wp-content/uploads/2014/09/Production-of-Novel-3D-Microstructures-Using-Excimer-Laser-M.pdf; last visited Jan. 19, 2016; 7 pp.

China First Office Action for Application No. 201710103119.5 dated Mar. 30, 2020; 14 pp.

* cited by examiner

SYSTEM AND METHOD OF FABRICATING AND REPAIRING A GAS TURBINE COMPONENT

BACKGROUND

The present disclosure relates generally to gas turbine engines and, more specifically, to systems and methods of forming protective caps around cooling holes in a gas turbine component.

In a gas turbine engine, air pressurized in a compressor is mixed with fuel in a combustor to generate hot combustion gases. Energy is initially extracted from the gases in a high pressure turbine (HPT) that powers the compressor, and subsequently in a low pressure turbine (LPT) that powers a fan in a turbofan aircraft engine application, or powers an external shaft for marine and/or industrial applications. Generally, engine efficiency increases as the temperature of combustion gases is increased. However, the increased gas temperature increases the operating temperature of various components along the gas flowpath, which in turn increases the need for cooling such components to facilitate extending their useful life.

For example, at least some known gas turbine components, such as blades, nozzles, and liners, require cooling during operation of the gas turbine engine. In at least some gas turbine engines, flowpath components exposed to hot combustion gases are cooled using compressor bleed air. For example, at least some known components channel the compressor bleed air through film cooling holes defined within the gas turbine components. However, the gas turbine components generally have a limited service life and must be periodically serviced to ensure the gas turbine components continue to function properly. Servicing the gas turbine components typically includes removal of an existing thermal barrier coating and subsequent reapplication of a thermal barrier coating to the components. The film cooling holes may become blocked when reapplying the thermal barrier coating, and cleaning and clearing the film cooling holes of the coating is a time-consuming and laborious task.

BRIEF DESCRIPTION

In one aspect, a method of fabricating or repairing a gas turbine component having a plurality of cooling holes defined therein is provided. The method includes determining a parameter of a first cooling hole defined in the gas turbine component, and generating a tool path for forming a protective cap around the first cooling hole. The tool path is based at least partially on the parameter of the first cooling hole. The method also includes directing a robotic device to follow the tool path, and discharging successive layers of ceramic slurry towards the gas turbine component as the tool path is followed such that the protective cap is formed around the first cooling hole.

In another aspect, a system for use in fabricating or repairing a gas turbine component having a plurality of cooling holes defined therein is provided. The system includes a robotic device including a slurry discharge nozzle, and a computing device coupled in communication with the robotic device. The computing device is configured to determine a parameter of a first cooling hole defined in the gas turbine component, and generate a tool path for forming a protective cap around the first cooling hole. The tool path is based at least partially on the parameter of the first cooling hole. The computing device is also configured to direct the robotic device to follow the tool path, and direct the robotic device to discharge successive layers of ceramic slurry towards the gas turbine component as the tool path is followed such that the protective cap is formed around the first cooling hole.

In yet another aspect, a non-transitory computer-readable storage media having computer-executable instructions embodied thereon for use in fabricating or repairing a gas turbine component having a plurality of cooling holes defined therein is provided. When executed by at least one processor, the computer-executable instructions cause the processor to determine a parameter of a first cooling hole defined in the gas turbine component, and generate a tool path for forming a protective cap around the first cooling hole. The tool path is based at least partially on the parameter of the first cooling hole. The computer-executable instructions also cause the processor to direct a robotic device to follow the tool path, and direct the robotic device to discharge successive layers of ceramic slurry towards the gas turbine component as the tool path is followed such that the protective cap is formed around the first cooling hole.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Embodiments of the present disclosure relate to turbine engines and related systems and methods of fabricating or repairing turbine engines. More specifically, the systems and methods described herein facilitate forming temporary protective caps around cooling holes defined in gas turbine components. The protective caps restrict coating material from flowing into the cooling holes when a thermal barrier coating is applied over the gas turbine component. Moreover, the protective caps are formed from a ceramic slurry material such that protective caps of varying shapes and sizes may be formed on the gas turbine component based on the dimensions of each cooling hole. Once the protective caps have cured, the thermal barrier coating is applied over the protective caps, allowed to cure, and the cooling holes are reopened by removing the material extending over the cooling holes. As such, the thermal barrier coating is restricted from flowing into the cooling holes, which facilitates reducing the time and complexity of fabricating or refurbishing components having a thermal barrier coating applied thereto.

Figure 1:
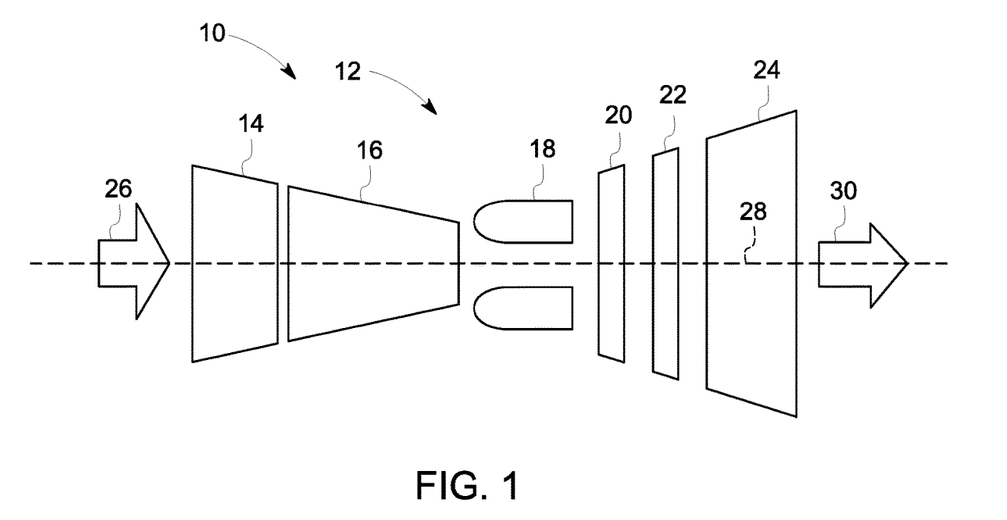
FIG. 1 is a schematic illustration of an exemplary gas turbine engine.

FIG. 1 is a schematic illustration of an exemplary gas turbine engine 10. In the exemplary embodiment, gas turbine engine 10 includes a gas turbine engine 12 that includes a low pressure compressor 14, a high pressure compressor 16, and a combustor assembly 18 positioned downstream from high pressure compressor 16. Gas turbine engine 12 also includes a high pressure turbine 20 positioned downstream from combustor assembly 18, a low pressure turbine 22 positioned downstream from high pressure turbine 20, and a power turbine 24 positioned downstream from low pressure turbine 22.

In operation, a flow of intake air 26 is channeled through low pressure compressor 14 and a flow of compressed air is channeled from low pressure compressor 14 to high pressure compressor 16. The compressed air is discharged from high pressure compressor 16 and channeled towards combustor assembly 18, where the air is mixed with fuel and combusted to form a flow of combusted gas discharged towards high pressure turbine 20. The flow of combusted gas discharged from combustor assembly 18 drives high pressure turbine 20 about a centerline 28 of gas turbine engine 12, and the flow of combusted gas is channeled through turbines 20 and 22 and then discharged from gas turbine engine 12 in the form of a flow of exhaust gas 30.

Figure 2:
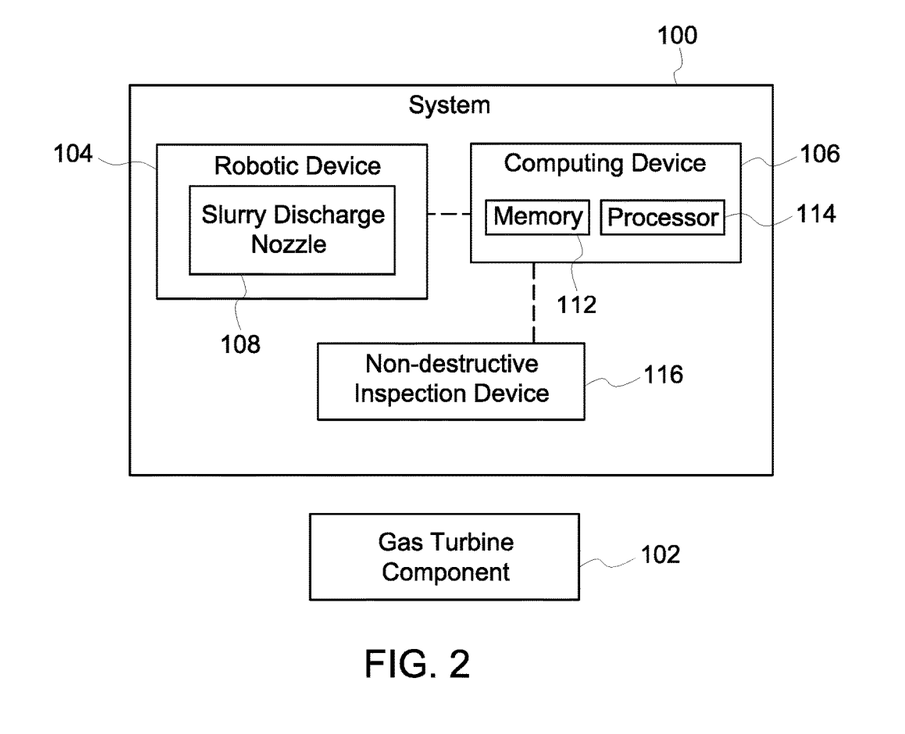
FIG. 2 is a block diagram illustrating an exemplary system for use in fabricating or repairing a gas turbine component that may be used in the gas turbine engine shown in FIG. 1.
Figure 3:
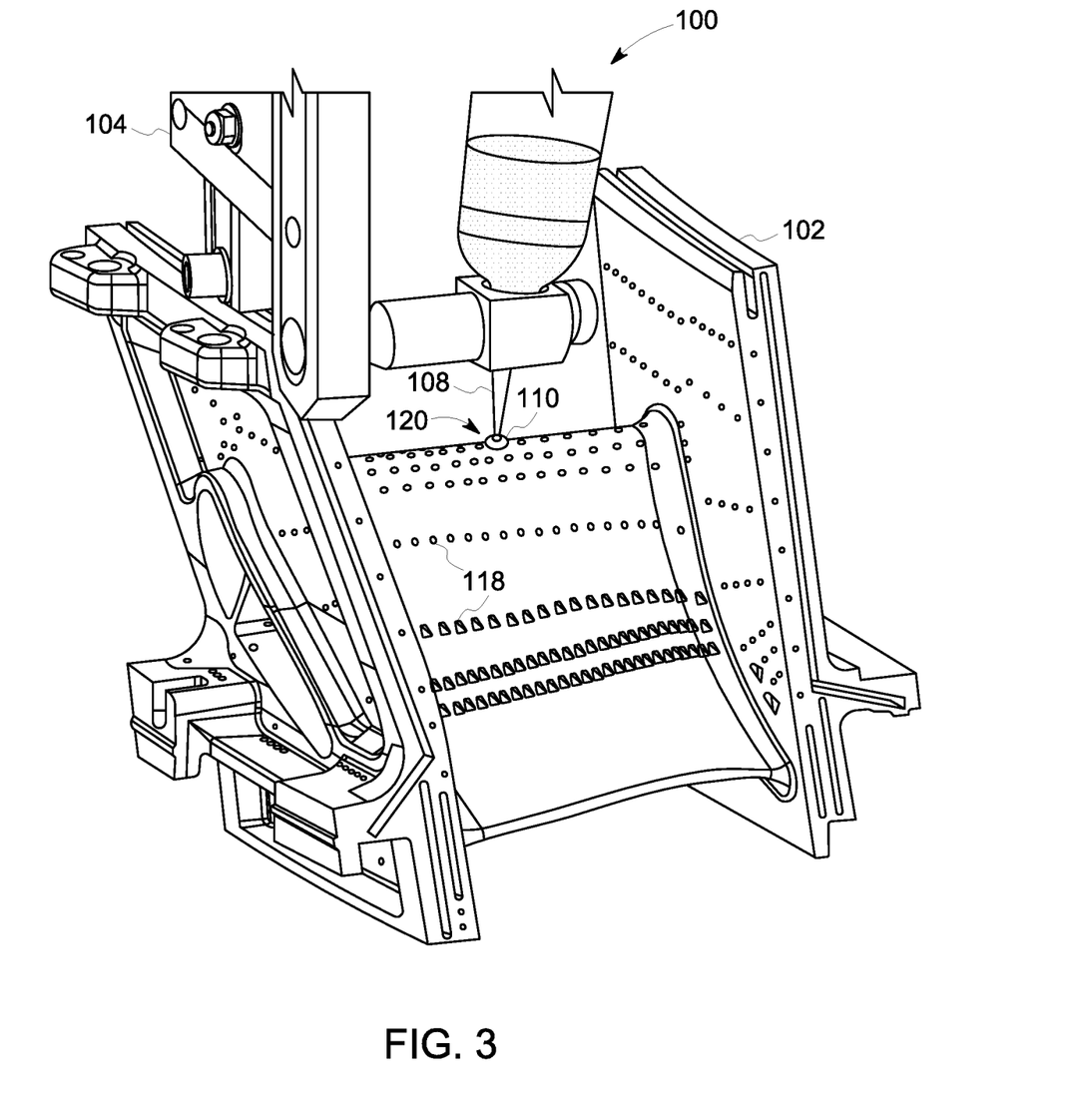
FIG. 3 is a perspective illustration of the system shown in FIG. 2.

FIG. 2 is a block diagram illustrating an exemplary system 100 for use in fabricating or repairing a gas turbine component 102 that may be used in gas turbine engine 10 (shown in FIG. 1), and FIG. 3 is a perspective illustration of system 100. In the exemplary embodiment, system 100 includes a robotic device 104 and a computing device 106 coupled in communication with robotic device 104. Robotic device 104 includes a slurry discharge nozzle 108. As will be explained in more detail below, slurry discharge nozzle 108 discharges successive layers of ceramic slurry towards gas turbine component 102 for forming a protective cap 110 thereon.

Computing device 106 includes a memory 112 and a processor 114, comprising hardware and software, coupled to memory 112 for executing programmed instructions. Processor 114 may include one or more processing units (e.g., in a multi-core configuration) and/or include a cryptographic accelerator (not shown). Computing device 106 is programmable to perform one or more operations described herein by programming memory 112 and/or processor 114. For example, processor 114 may be programmed by encoding an operation as executable instructions and providing the executable instructions in memory 112.

Processor 114 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 114, cause processor 114 to perform at least a portion of the functions described herein. The above examples are exemplary only, and thus are not intended to limit in any way the definition and/or meaning of the term processor.

Memory 112 is one or more devices that enable information such as executable instructions and/or other data to be stored and retrieved. Memory 112 may include one or more computer-readable media, such as, without limitation, dynamic random access memory (DRAM), synchronous dynamic random access memory (SDRAM), static random access memory (SRAM), a solid state disk, and/or a hard disk. Memory 112 may be configured to store, without limitation, executable instructions, operating systems, applications, resources, installation scripts and/or any other type of data suitable for use with the methods and systems described herein.

Instructions for operating systems and applications are located in a functional form on non-transitory memory 112 for execution by processor 114 to perform one or more of the processes described herein. These instructions in the different implementations may be embodied on different physical or tangible computer-readable media, such as memory 112 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from computing device 106 to permit access and/or execution by processor 114. In an alternative implementation, the computer-readable media is not removable.

System 100 also includes a non-destructive inspection device 116 coupled in communication with computing device 106. Non-destructive inspection device 116 is any non-destructive inspection device that enables system 100 to function as described herein. Exemplary non-destructive inspection devices include, but are not limited to, an ultrasonic testing device, an X-ray testing device, and a computed tomography (CT) scanning device. As will be described in more detail below, non-destructive inspection device 116 operates, either continuously or at predetermined intervals, to determine a parameter of cooling holes 118 defined in gas turbine component 102. More specifically, at least one of a size of cooling holes 118, an edge profile of cooling holes 118, or a location of cooling holes 118 on gas turbine component 102 are determined to facilitate determining the size, shape, and location of protective caps 110 to be formed over each cooling hole 118. For example, cooling holes 118 of different shapes and sizes may be defined in gas turbine component 102, conducting a non-destructive inspection of gas turbine component 102 ensures the parameter of each cooling hole 118 is accurately determined. In an alternative embodiment, the parameter of cooling holes 118 is determined from a schematic of gas turbine component 102.

In operation, computing device 106 directs non-destructive inspection device 116 to inspect gas turbine component 102 to determine the parameter of a first cooling hole 120 to be covered. Computing device 106 then generates a tool path for forming protective cap 110 around first cooling hole 120, and the tool path is based at least partially on the parameter of first cooling hole 120. Computing device 106 then directs robotic device 104 to follow the tool path, and directs robotic device 104 to discharge successive layers of ceramic slurry towards gas turbine component 102 as the tool path is followed such that protective cap 110 is formed around first cooling hole 118. After first cooling hole 118 is covered, computing device 106 then direct robotic device 104 to form protective caps 110 around additional cooling holes based on the parameters determined from the non-destructive inspection described above.

In an alternative embodiment, the parameters of first cooling hole 120 are determined from a virtual model of gas turbine component 102, or from a combination of a non-destructive inspection of gas turbine component 102 and the virtual model of gas turbine component 102.

Figure 4:
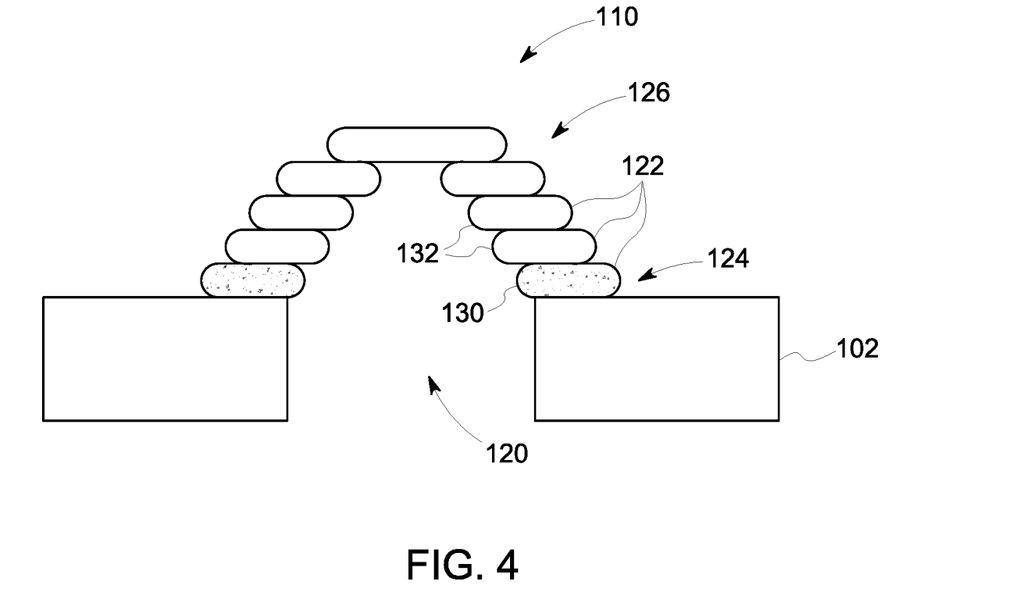
FIG. 4 is a cross-sectional illustration of an exemplary gas turbine component having a protective cap formed thereon, in accordance with a first processing step.
Figure 5:
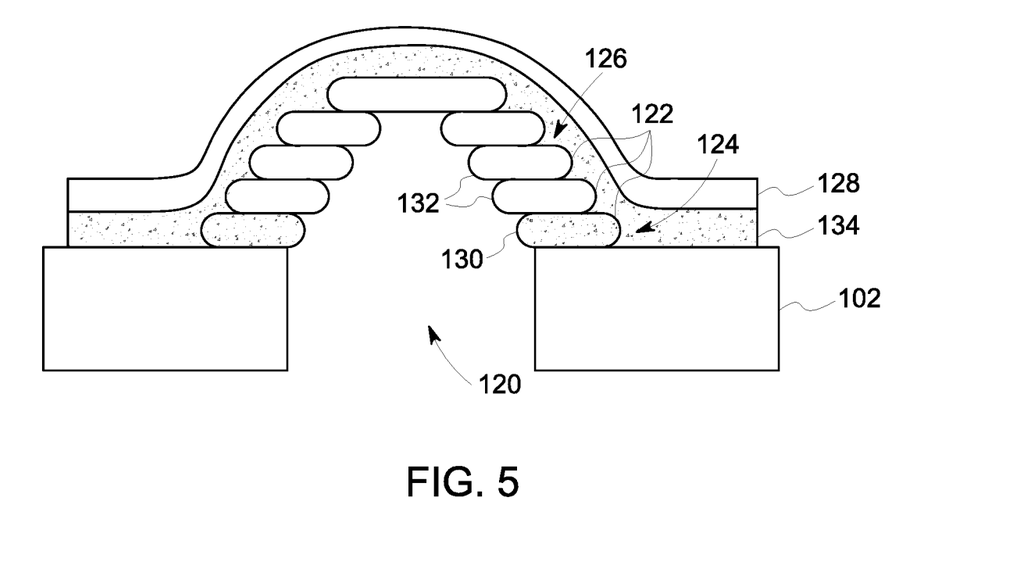
FIG. 5 is a cross-sectional illustration of the gas turbine component shown in FIG. 4, in accordance with a second processing step.
Figure 6:
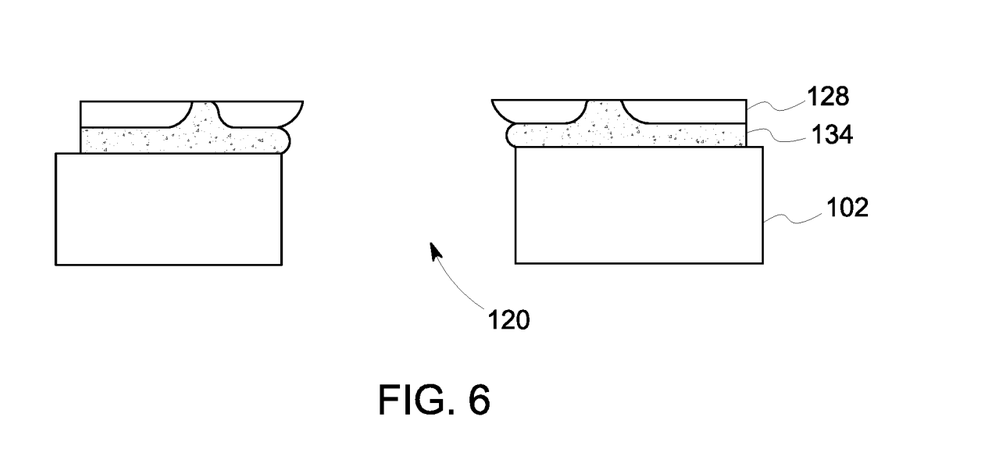
FIG. 6 is a cross-sectional illustration of the gas turbine component shown in FIG. 5, in accordance with a third processing step.

FIG. 4 is a cross-sectional illustration of an exemplary gas turbine component 102 having protective cap 110 formed thereon, in accordance with a first processing step, FIG. 5 is a cross-sectional illustration of gas turbine component 102, in accordance with a second processing step, and FIG. 6 is a cross-sectional illustration of gas turbine component 102, in accordance with a third processing step. In the exemplary embodiment, and as described above, computing device 106 (shown in FIG. 3) generates a tool path for forming protective cap 110 around first cooling hole 120 after at least one parameter of first cooling hole 120 is determined. More specifically, computing device 106 generates a hollow three-dimensional representation that defines protective cap 110, and determines an arrangement of a plurality of individual layers 122 for forming the three-dimensional representation of protective cap 110. The plurality of individual layers 122 correspond to the successive layers of ceramic slurry used to form protective cap 110 on gas turbine component 102.

The three-dimensional representation of protective cap 110 is generated in accordance with one or more design parameters. Exemplary design parameters include, forming protective cap 110 from a base portion 124 and a dome portion 126, forming base portion 124 to follow the contour of side edges of first cooling hole 120, forming base portion 124 having a thickness substantially equal to a thickness of a thermal barrier coating layer 128 (shown in FIG. 5) to be applied over protective cap 110, forming dome portion 126 with a converging shape to facilitate covering first cooling hole 120, and forming dome portion 126 such that a vertical profile thereof follows a circular arc.

Computing device 106 generates the tool path for forming protective cap 110 by slicing the three-dimensional representation of protective cap 110 into the plurality of individual layers 122. The thickness of each individual layer 122, and the percentage overlap between adjacent individual layers 122 may be modified along the height of protective cap 110 such that protective cap 110 is formed in a time-efficient manner with enhanced stability. More specifically, in one embodiment, computing device 106 defines a progressive reduction in thickness of the plurality of individual layers 122 as a distance between each individual layer 122 and gas turbine component 102 increases. In another embodiment, computing device 106 defines a progressive reduction in overlap between adjacent individual layers 122 as a distance between the adjacent individual layers 122 and gas turbine component increases. Alternatively, individual layers 122 may have a uniform thickness, and the overlap between adjacent individual layers 122 is uniform along the height of protective cap 110.

In the exemplary embodiment, base portion 124 is formed from at least a first individual layer 130 applied directly onto gas turbine component 102, and dome portion 126 is formed from successive second individual layers 132 applied over first individual layer 130. The layers of protective cap 110 may be formed from any material that enables system 100 to function as described herein. An exemplary material includes, but is not limited to, an aqueous ceramic-based slurry formed with an inorganic binder material. As such, the slurry has self-curing characteristics, and the inorganic binder material is generally resistant to burnout during one or more curing cycles. The inorganic binder material may also be a refractory cement capable of withstanding increased temperatures during deposition of thermal barrier coating layer 128 thereon, and also of the high temperatures during operation of gas turbine engine 10 (shown in FIG. 1). The slurry may also include a refractory ceramic material, such as yttria-stabilized zirconia (YSZ) powder with a multimodal size distribution. The bimodal size distribution enables larger solids loading, and sub-micron sized powder is used for rheology control.

In one embodiment, first individual layer 130 is fabricated from a first material, and the successive second individual layers 132 are fabricated from a second material different from the first material. The first material is a bond coat layer, and the second material is the ceramic slurry described above. The bond coat layer facilitates defining a smooth transition between gas turbine component 102 and second individual layers 132, and also provides enhanced adhesion and corrosion protection to gas turbine component 102. The bond coat layer may be formed from any suitable material such as, but not limited to, a composition including chromium, aluminum, yttria, and at least one of nickel, cobalt, or a combination thereof.

Referring to FIG. 5, a bond coat layer 134 and a thermal barrier coating layer 128 are applied over gas turbine component 102 and over protective cap 110 after the ceramic slurry has cured. Referring to FIG. 6, first cooling hole 120 is cleared by removing thermal barrier coating layer 128, bond coat layer 134, and at least a portion of protective cap 110. The material is removed by grinding or polishing, for example. As such, protective cap 110 restricts bond coat layer 134 and thermal barrier coating layer 128 from entering first cooling hole 120 during the application process. Bond coat layer 134 may be formed from any suitable material such as, but not limited to, a composition including chromium, aluminum, yttria, and at least one of nickel, cobalt, or a combination thereof.

Figure 7:
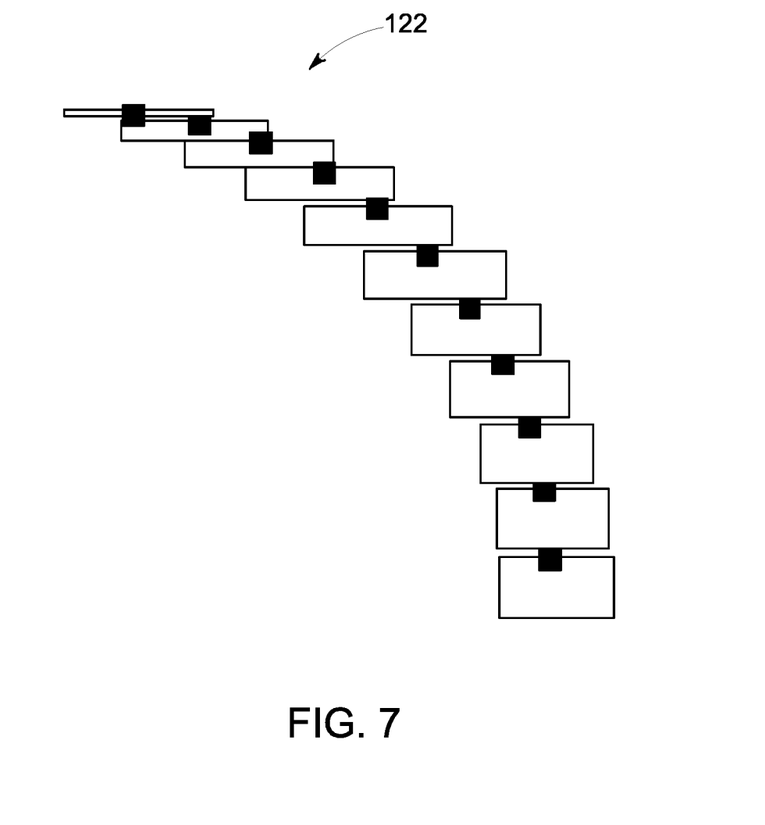
FIG. 7 is a schematic illustration of an exemplary layering sequence for use in forming a protective cap.
Figure 8:
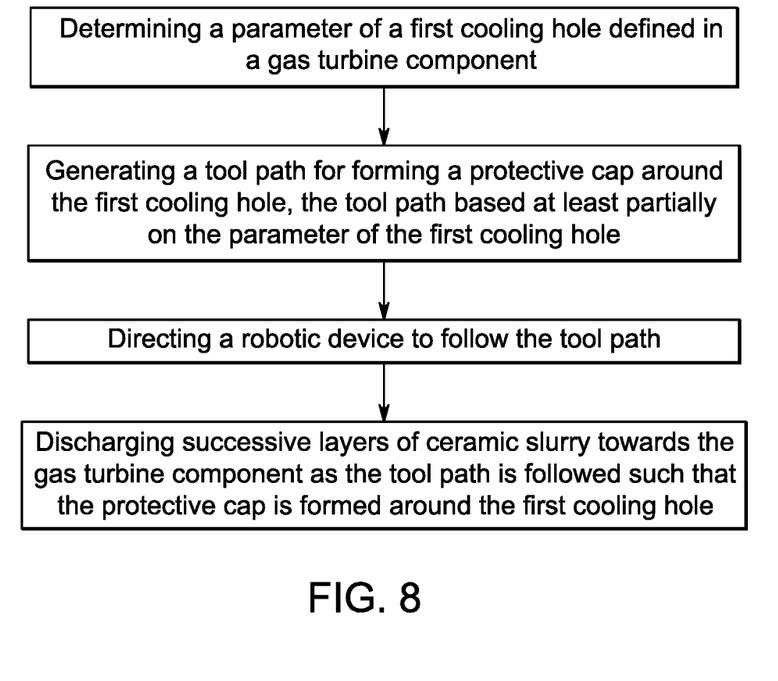
FIG. 8 is a flow diagram of an exemplary method of fabricating and repairing a gas turbine component.

FIG. 7 is a schematic illustration of an exemplary layering sequence for use in forming protective cap 110. In the exemplary embodiment, and as described above, the plurality of individual layers 122 progressively reduce in thickness as a distance from gas turbine component 102 (shown in FIG. 3) increases, and the amount of overlap between adjacent individual layers 122 progressively reduces as the adjacent individual layers 122 are positioned a greater distance from gas turbine component 102. More specifically, the amount of overlap to define between adjacent individual layers 122 is determined based on the thickness of each successive individual layer 122. As such, thicker individual layers 122 are layered closer to gas turbine component 102 to reduce the number of layers required to form protective cap 110, and thinner individual layers 122 are layered farther away from gas turbine component 102 than the thicker individual layers 122 to ensure protective cap 110 remains stable as the ceramic slurry cures.

An exemplary technical effect of the system and methods described herein includes at least one of: (a) restricting coating material from entering cooling holes defined in a component; (b) reducing the time and complexity required to clear cooling holes of coating material; and (c) enabling the formation of protective caps of varying shapes and sizes in an automated manner.

Exemplary embodiments of a turbine engines and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbine engines and related methods as described herein. Rather, the exemplary embodiment can be implemented and utilized in connection with many applications where adaptably forming three-dimensional structures is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit any way the definition and/or meaning of the term processor.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for use in fabricating and repairing a gas turbine component having a plurality of cooling holes defined therein, said system comprising:
a robotic device comprising a slurry discharge nozzle; and
a computing device coupled in communication with said robotic device, said computing device configured to:
determine a parameter of a first cooling hole defined in the gas turbine component;
generate a tool path for forming a protective cap around the first cooling hole, the tool path based at least partially on the parameter of the first cooling hole;
direct the robotic device to follow the tool path; and
direct the robotic device to discharge successive layers of ceramic slurry towards the gas turbine component as the tool path is followed such that the protective cap is formed around the first cooling hole.

2. The system in accordance with claim 1 further comprising a non-destructive inspection device configured to inspect the gas turbine component, said computing device further configured to direct the non-destructive inspection device to determine the parameter of the first cooling hole.

3. The system in accordance with claim 1, wherein the ceramic slurry comprises yttria-stabilized zirconia powder with a multimodal size distribution.

4. The system in accordance with claim 1, wherein said computing device is further configured to determine an arrangement of a plurality of individual layers for forming a three-dimensional representation of the protective cap, wherein the plurality of individual layers substantially correspond to the successive layers of ceramic slurry.

5. The system in accordance with claim 4, wherein said computing device is further configured to define a progressive reduction in overlap between adjacent individual layers as a distance between the adjacent individual layers and the gas turbine component increases.

6. The system in accordance with claim 4, wherein said computing device is further configured to define a progressive reduction in thickness of each individual layer of the plurality of individual layers as a distance between each individual layer and the gas turbine component increases.

7. The system in accordance with claim 6, wherein said computing device is further configured to control at least one of a flow rate for discharging the ceramic slurry or a tool speed to define a progressive reduction in thickness of the successive layers of ceramic slurry that corresponds to the progressive reduction in thickness of each individual layer of the plurality of individual layers.

8. The system in accordance with claim 1, wherein said computing device is further configured to:
direct the robotic device to apply a first layer of ceramic slurry on the gas turbine component, the first layer fabricated from a first material; and
direct the robotic device to apply successive second layers of ceramic slurry on the first layer, the successive second layers fabricated from a second material different from the first material.

9. The system in accordance with claim 8, wherein the first material is formed from a composition including chromium, aluminum, yttria, and at least one of nickel, cobalt, or a combination thereof.

10. The system in accordance with claim 8, wherein the computing device is further configured to direct the robotic device to apply a dome portion over the successive second layers, wherein the first layer, the successive second layers, and the dome portion have a profile that follows a circular arc.

11. The system in accordance with claim 8, wherein the second material is an aqueous ceramic-based slurry with an inorganic binder material.

12. The system in accordance with claim 11, wherein the inorganic binder material comprises a refractory cement.

13. The system in accordance with claim 8, wherein the computing device is further configured to apply a bond coat layer over the protective cap after the ceramic slurry has cured.

14. The system in accordance with claim 13, wherein the bond coat layer is formed from a composition including chromium, aluminum, yttria, and at least one of nickel, cobalt, or a combination thereof.

15. The system in accordance with claim 13, wherein the computing device is further configured to apply a thermal barrier coating layer over the bond coat layer.

16. A computer-readable storage media having computer-executable instructions embodied thereon for use in fabricating or repairing a gas turbine component having a plurality of cooling holes defined therein, wherein, when executed by at least one processor, the computer-executable instructions cause the processor to:
determine a parameter of a first cooling hole defined in the gas turbine component;
generate a tool path for forming a protective cap around the first cooling hole, the tool path based at least partially on the parameter of the first cooling hole;
direct a robotic device to follow the tool path; and
direct the robotic device to discharge successive layers of ceramic slurry towards the gas turbine component as the tool path is followed such that the protective cap is formed around the first cooling hole.

17. The computer-readable storage media in accordance with claim 16, wherein the computer-executable instructions further cause the processor to:
direct the robotic device to apply a first layer of ceramic slurry on the gas turbine component, the first layer fabricated from a first material; and
direct the robotic device to apply successive second layers of ceramic slurry on the first layer, the successive second layers fabricated from a second material different from the first material.

18. The computer-readable storage media in accordance with claim 16, wherein the computer-executable instructions further cause the processor to determine an arrangement of a plurality of individual layers for forming a three-dimensional representation of the protective cap, wherein the plurality of individual layers correspond to the successive layers of ceramic slurry.

19. The computer-readable storage media in accordance with claim 18, wherein the computer-executable instructions further cause the processor to define a progressive reduction in thickness of the plurality of individual layers as a distance between each individual layer and the gas turbine component increases.

20. The computer-readable storage media in accordance with claim 18, wherein the computer-executable instructions further cause the processor to define a progressive reduction in overlap between adjacent individual layers as a distance between the adjacent individual layers and the gas turbine component increases.

* * * * *